J. F. Seiberling,

Harvester Dropper.

No. 1699 Reissued. June. 14. 1864.

John F. Seiberling.
By Daniel Breed Atty.

UNITED STATES PATENT OFFICE.

JOHN F. SEIBERLING, OF DOYLESTOWN, OHIO.

IMPROVEMENT IN HARVESTERS.

Specification forming part of Letters Patent No. 33,496, dated October 15, 1861; Reissue No. 1,699, dated June 14, 1864.

DIVISION B.

*To all whom it may concern:*

Be it known that I, JOHN F. SEIBERLING, of Doylestown, in the county of Wayne and State of Ohio, have invented a new and useful Improvement in Harvesters; and I do hereby declare that the following is a full and exact description thereof, reference being had to the accompanying drawings, and to the letters of reference marked thereon.

In harvesters having a dropping platform for the discharge of the gavel, the separation of the latter from the falling grain not being provided for, there is a constant entanglement of the grain forming the gavel with that just cut, and the clearing of the gavel is thus hindered. For the removal of this difficulty I have combined a cut-off with a dropper or falling platform, and arranged a treadle with levers so as to operate both the cut-off and the platform simultaneously.

My invention consists in a new arrangement and combination of levers and other devices for operating the platform and cut-off.

Figure 2:
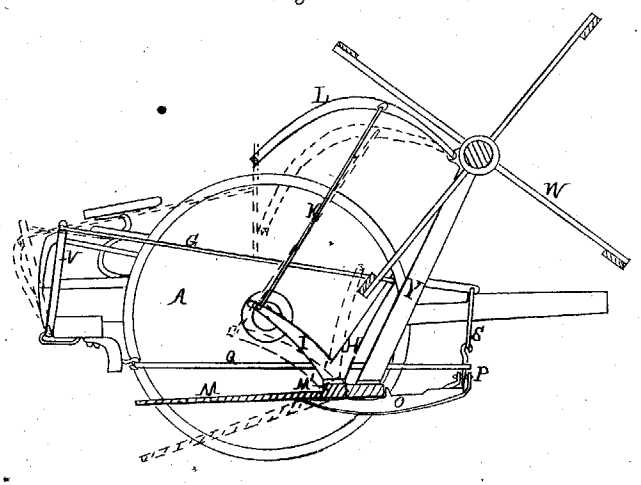
Figure 1:
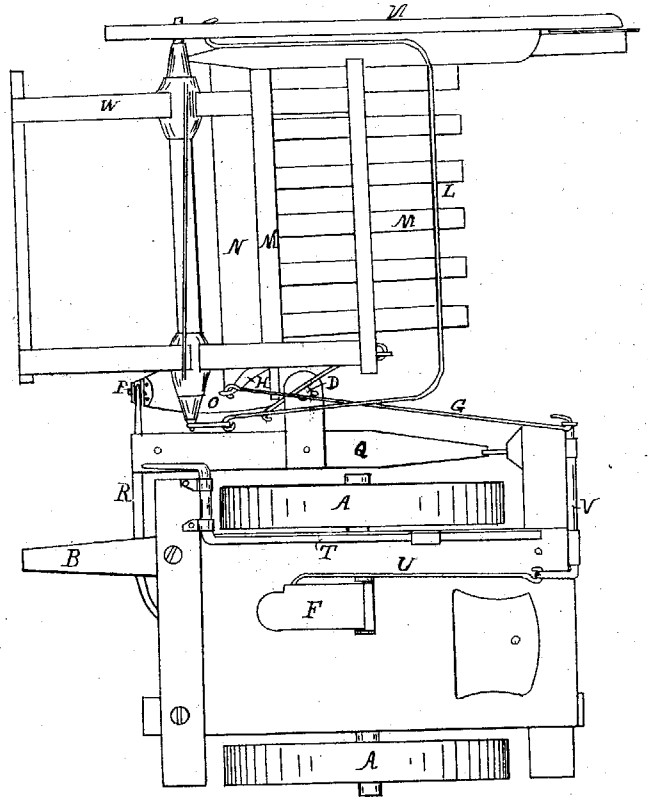

In the accompanying drawings, Figure 1 is a top view of my harvester. Fig. 2 is a vertical longitudinal section of the same, the section being made through the fingered dropper or platform and the reel.

The harvester has two main wheels, A, and is drawn by pole B in the usual manner. The outer end of the finger-beam is supported by a caster-wheel, which also in part carries the reel, the platform, the outer shoe, and dividing-board.

My tilting platform has a rock-shaft, M′, and a series of fingers, M. Attached to the rock-shaft M′ is a lever, H, which is connected by rod G to the elbow-lever V. This lever V is connected by rod U to the treadle F. By this arrangement the driver has perfect control of the rock-shaft M′, and he can raise or lower the fingers M at pleasure.

Attached to the standards of the reel W a cut-off, L, is so arranged as to cut off or suspend the fall of the grain. When this cut-off is let down the heads of the falling grain are arrested and held until the dropper or platform throws off the gavel. The falling grain is thus prevented from entangling with the gavel. By means of lever I and rod K this cut-off is operated simultaneously with the dropper or platform by the same movement of the treadle.

I do not herein claim the cut-off and fingered platform, as I propose to protect my use of such devices in separate patents.

Having thus fully described my invention, what I claim, and desire to secure by Letters Patent of the United States, is—

1. The arrangement and combination of the treadle F, rod U, lever V, rod G, and lever H, for elevating and depressing the platform M, substantially as set forth.

2. In combination with the parts F, U, V, G, and H, the lever I, and rod K, for operating the cut-off, substantially as set forth, for the purposes mentioned.

JOHN F. SEIBERLING.

Witnesses:

AMOS HENRICKS,

ABRAHAM B. CAPP.